March 19, 1935.    W. A. BOHNE    1,994,604
EMBOSSED BELTING
Filed Nov. 1, 1932
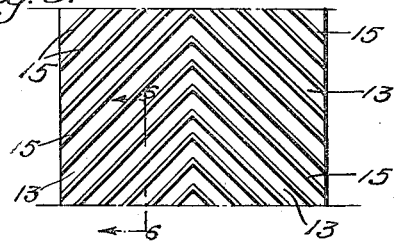
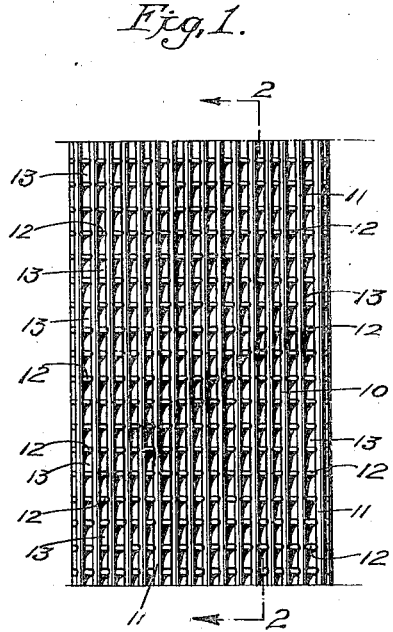
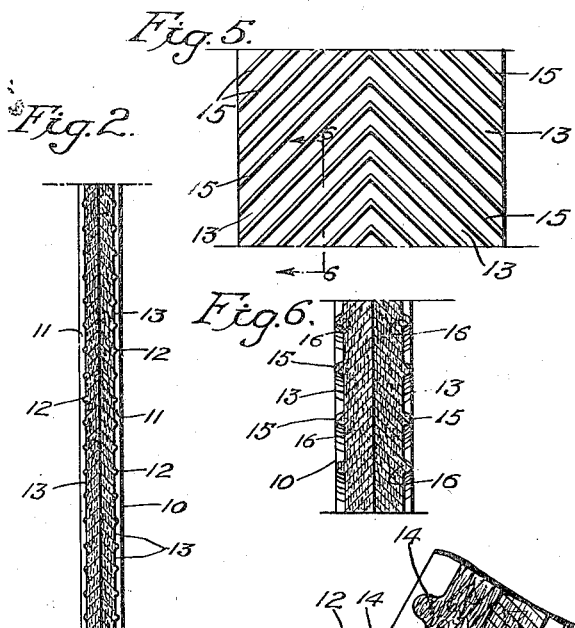
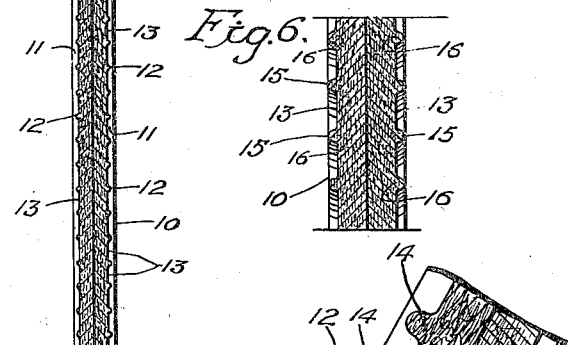
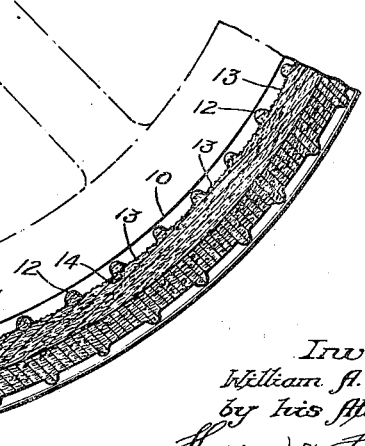
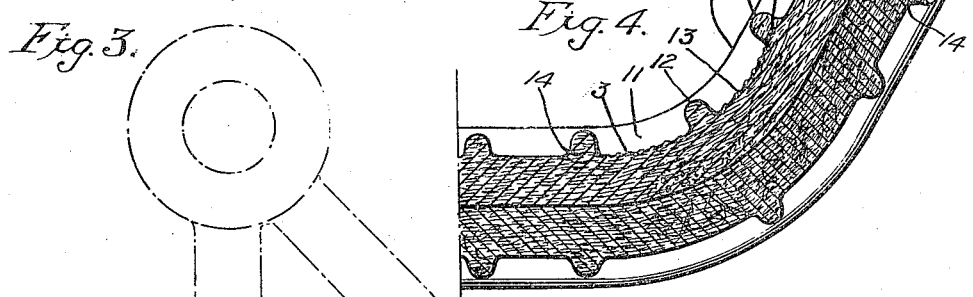
Inventor:—
William A. Bohne
by his Attorneys
Howson & Howson Patented Mar. 19, 1935

1,994,604

UNITED STATES PATENT OFFICE 1,994,604

EMBOSSED BELTING

William A. Bohne, Philadelphia, Pa., assignor to E. F. Houghton & Company, Philadelphia, Pa., a corporation of Pennsylvania Application November 1, 1932, Serial No. 640,725

2 Claims. (Cl. 74—231)

This invention relates to embossed leather beltings and method of producing the same, and has for an important object thereof the provision of practical embossed belting having longitudinally-extending traction ribs for engagement with the surface of a pulley. It has long been recognized that reduction of the area of any driving surface in a manner preventing air pocketing between the driving surface and the driven surface will increase the driving efficiency, eliminating slip commonly resulting from such air pocketing.

An obvious method of accomplishing this effect is by forming ribs upon the surface. Direct transverse grooving is objectionable in that it provides the surface of the belt with a series of transverse ribs which, in contact with the pulley surface, have a great deal of the action of a roller bearing and cause considerable slip, thus defeating the purpose of the grooving. Longitudinal grooving, while offering considerable advantage over the transverse grooving, is relatively inefficient due to the fact that in forming the longitudinal grooves there is an excess of material at the bottoms of the grooves, stiffening the bottoms of these grooves and causing any puckering resulting from flexing of the belt to extend into the longitudinal ribs.

An important object of this invention is the provision of a grooved belting in which this puckering is eliminated.

A further object of the invention is the provision of a belt comprising an embossed face having a longitudinally smooth gripping surface and longitudinally compressible areas interrupting longitudinal continuity of the lower faces of depressed areas whereby the increased stiffness of these compressed areas is compensated for and compression may take place at the bases of the longitudinally compressible areas without any deformation extending to the gripping surface.

A further object of the invention is the provision of a belt of increased efficiency which may be produced at a relatively low cost.

These and other objects I attain by the construction shown in the accompanying drawing wherein, for the purpose of illustration, I have shown a preferred embodiment of my invention and wherein:

Fig. 1 is a plan of a section of belting constructed in accordance with my invention;

Fig. 2 is a section on line 2—2 thereof;

Fig. 3 is an enlarged section showing the belting in engagement with a pulley surface;

Fig. 4 is a still further enlargement of a section of the belting showing the result of abrupt kinking;

Fig. 5 is a fragmentary plan view of a belting showing a modified arrangement producing the same results; and Fig. 6 is a fragmentary section on line 6—6 of Fig. 5.

In accordance with my method, the belt is embossed in a pattern such that longitudinal balance of any angular contact surface is maintained, and at the same time all depressed sections are interrupted by transversely-extending ribs or puckered portions the bases of which are readily compressed by any longitudinal pressures set up as a result of flexing of the belt thus distributing these forces at points where they will not affect the gripping surface of the belt.

In the form shown in Figs. 1 to 4, the gripping surface 10 comprises the peaks of directly longitudinally-extending ribs 11. If the material depressed in formation of these ribs is arranged in a common plane, the belt when flexed will wrinkle in the ribs 11 producing protuberances having the same objectionable characteristics as transverse ribs. In depressing the material to form the grooves between adjacent ribs, I produce transversely extending ribs 12, these ribs being preferably of slightly less depth than ribs 11 and being at present shown as arranged at uniform intervals and in aligned rows, although this arrangement may be readily modified. With the provision of ribs 12 longitudinal wrinkling of the surfaces of ribs 11 is eliminated due to the fact that the stiffened material 13 comprising the bottom of the grooves between adjacent ribs 11 and resulting from compression of the material depressed in the formation of these grooves may now exert its rigidity against the longitudinally-compressible areas 14 comprising the bases of ribs 12 and compress them to an extent compensating for the crowding resulting from flexing as suggested in the enlarged sectional view of Fig. 4.

I have above stated that the arrangement shown in Figs. 1 to 4 is capable of considerable modification and, as a matter of fact, any type of permanent transverse puckering of the bottom of the longitudinal grooves to provide compressible areas will accomplish the desired function. In such a belt as noted from the enlarged sections, there is a slight temporary puckering of the material at the bottoms of the longitudinally-extending grooves, but this puckering is of such reduced proportions that it exercises no noticeable effect upon the ribs 11 and these ribs combine at all times to produce a smooth pulley-engaging surface even when employed with a relatively small pulley.

This result may be likewise accomplished by employing any rib arrangement in which the longitudinally depressed areas are interrupted by longitudinally compressible areas even though these areas comprise the bases of the ribs the upper surfaces of which constitute the driving surface, provided these ribs produce a longitudinally unbroken driving surface. Such an arrangement is shown in Figs. 5 and 6 in which the surface of the belt has been provided with herring-bone ribbing, indicated at 15. Such ribbing will, of course, tend to interrupt all longitudinal depression of the surface and the bases of the ribs 15 constitute compressible areas 16 against which the rigid surfaces 13 at the bottom of the depressed areas may act.

A belt constructed in the foregoing manner, in addition to having those advantages hereinbefore pointed out and those obtained by reduction of surface area, such as greater grip resulting from the reduction of contact area and consequent increase of friction, elimination of air pocketing, reduction of vibration due to the fact that the embossing insures uniform thickness and texture, reduction of breakage at laps or joints due to the fact that approximately fifty percent of the area of the belt is out of engagement with the pulley, and increased life of the belt due to the fact that lubricating matter in the belt is squeezed to the surface of the belt by increased pressure on the reduced area thereby keeping the grain soft and pliable, has a further advantage in that the transverse ribbing has a tendency to cause a slight bellows effect without any actual air trapping, which bellows effect tends to remove dust from the surface of the belt and pulley rendering the belt particularly advantageous for use in dusty atmospheres.

Since the specific arrangements hereinbefore set forth are capable of modification without in any manner departing from the spirit of my invention, I do not wish to be understood as limiting myself thereto except as hereinafter claimed.

I claim:

1. A belt comprising a band of leather or the like having an embossed driving face including continuous longitudinal ribs and traansverse ribs, the transverse ribs lying between the longitudinal ribs and having their upper faces disposed below the upper faces of the longitudinal ribs.

2. A belt comprising a band of leather or the like having an embossed driving face including continuous longitudinal ribs and transverse ribs, the transverse ribs lying between the longitudinal ribs and having their upper faces disposed below the upper faces of the longitudinal ribs, said transverse ribs being of materially reduced cross sectional area with respect to said longitudinal ribs.

WILLIAM A. BOHNE.